United States Patent
Chaudhry et al.

(10) Patent No.: US 7,257,700 B2
(45) Date of Patent: Aug. 14, 2007

(54) AVOIDING REGISTER RAW HAZARDS WHEN RETURNING FROM SPECULATIVE EXECUTION

(75) Inventors: Shailender Chaudhry, San Francisco, CA (US); Paul Caprioli, Mountain View, CA (US); Sherman H. Yip, San Francisco, CA (US); Marc Tremblay, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 313 days.

(21) Appl. No.: 11/053,382

(22) Filed: Feb. 7, 2005

(65) Prior Publication Data

US 2005/0273580 A1 Dec. 8, 2005

Related U.S. Application Data

(60) Provisional application No. 60/576,992, filed on Jun. 3, 2004.

(51) Int. Cl.
*G06F 9/48* (2006.01)
(52) U.S. Cl. .................................... 712/235
(58) Field of Classification Search .............. 712/235, 712/217, 228, 225
See application file for complete search history.

(56) References Cited

U.S. PATENT DOCUMENTS

| | | | | |
|---|---|---|---|---|
| 5,918,033 A * | 6/1999 | Heeb et al. | ............... | 712/217 |
| 6,035,389 A | 3/2000 | Grochowski et al. | ....... | 712/216 |
| 6,665,776 B2 * | 12/2003 | Jouppi et al. | ............... | 711/137 |
| 6,912,648 B2 * | 6/2005 | Hammarlund et al. | ...... | 712/219 |
| 2002/0091914 A1 * | 7/2002 | Merchant et al. | ........... | 712/219 |
| 2003/0061470 A1 * | 3/2003 | Yeh | ............................. | 712/219 |
| 2003/0135722 A1 * | 7/2003 | Johnson | ...................... | 712/235 |

FOREIGN PATENT DOCUMENTS

WO WO 03/040916 A1 5/2003

* cited by examiner

*Primary Examiner*—Eric Coleman
(74) *Attorney, Agent, or Firm*—Park, Vaughan & Fleming LLP

(57) ABSTRACT

One embodiment of the present invention provides a system that avoids register read-after-write (RAW) hazards upon returning from a speculative-execution mode. This system operates within a processor with an in-order architecture, wherein the processor includes a short-latency scoreboard that delays issuance of instructions that depend upon uncompleted short-latency instructions. During operation, the system issues instructions for execution in program order during execution of a program in a normal-execution mode. Upon encountering a condition (a launch condition) during an instruction (a launch-point instruction), which causes the processor to enter the speculative-execution mode, the system generates a checkpoint that can subsequently be used to return execution of the program to the launch-point instruction, and commences execution in the speculative-execution mode. Upon encountering a condition that causes the processor to leave the speculative-execution mode and return to the launch-point instruction, the system uses the checkpoint to resume execution in the normal-execution mode from the launch-point instruction. In doing so, the system ensures that entries that were in the short-latency scoreboard prior to entering the speculative-execution mode, and which are not yet resolved, are accounted for in order to prevent register RAW hazard when resuming execution from the launch-point instruction.

19 Claims, 7 Drawing Sheets

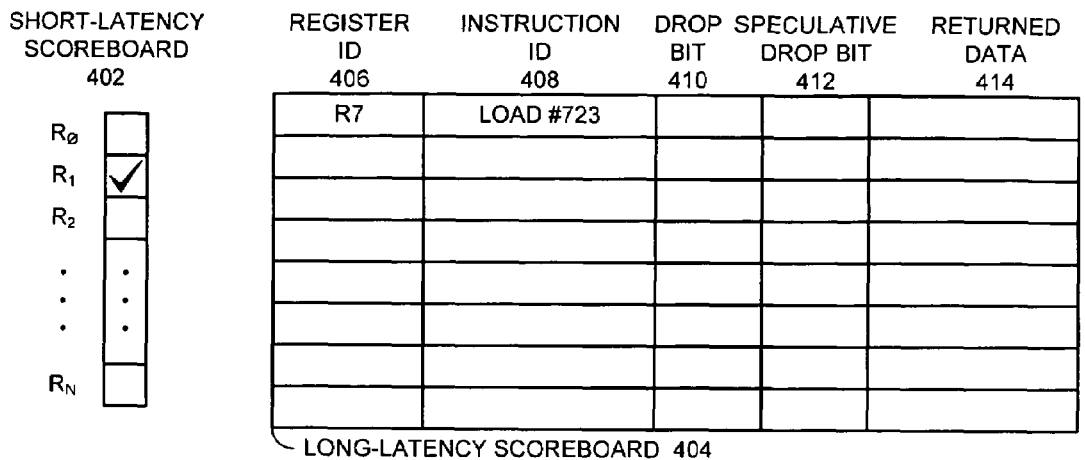
FIG. 4A    FIG. 4B
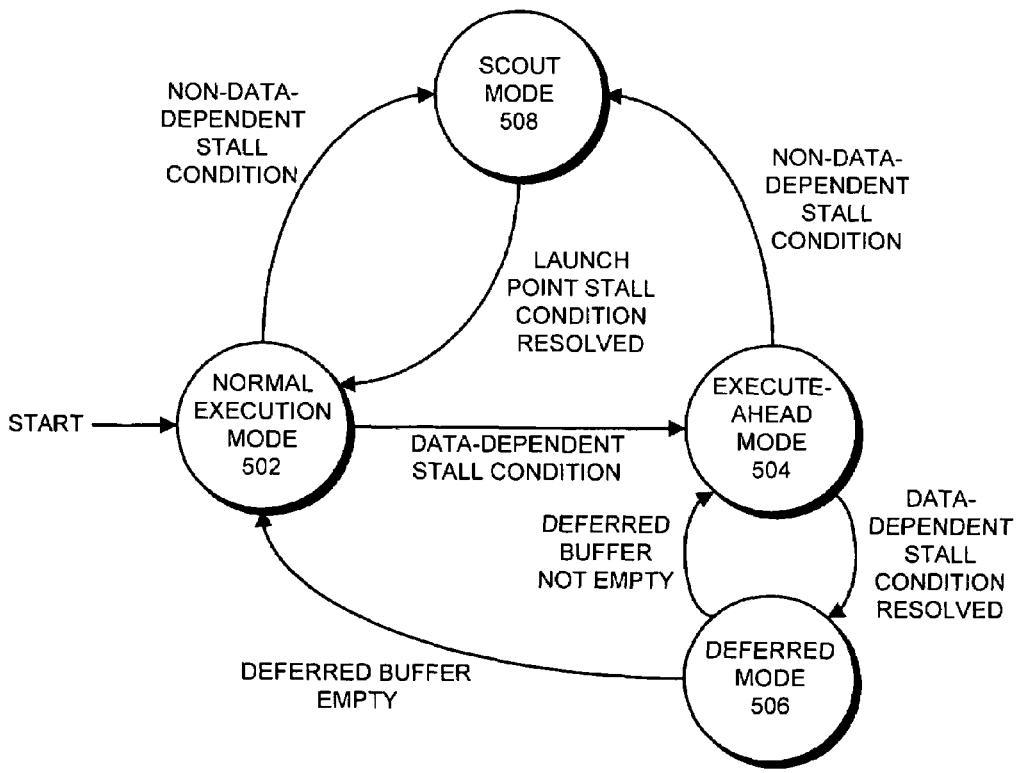
FIG. 5

AVOIDING REGISTER RAW HAZARDS WHEN RETURNING FROM SPECULATIVE EXECUTION

RELATED APPLICATION

This application hereby claims priority under 35 U.S.C. §119 to U.S. Provisional Patent Application No. 60/576,992 filed on 3 Jun. 2004, entitled "Avoiding Register RAW Hazards when Returning from Speculative Execution," by inventors Shailender Chaudhry, Paul Caprioli, Sherman H. Yip and Marc Tremblay.

BACKGROUND

1. Field of the Invention

The present invention relates to techniques for improving computer system performance. More specifically, the present invention relates to a method and an apparatus for avoiding register read-after-write (RAW) hazards when returning from speculative execution.

2. Related Art

Advances in semiconductor fabrication technology have given rise to dramatic increases in microprocessor clock speeds. This increase in microprocessor clock speeds has not been matched by a corresponding increase in memory access speeds. Hence, the disparity between microprocessor clock speeds and memory access speeds continues to grow, and is beginning to create significant performance problems. Execution profiles for fast microprocessor systems show that a large fraction of execution time is spent not within the microprocessor core, but within memory structures outside of the microprocessor core. This means that the microprocessor systems spend a large fraction of time waiting for memory references to complete instead of performing computational operations.

Efficient caching schemes can help reduce the number of memory accesses that are performed. However, when a memory reference, such as a load operation generates a cache miss, the subsequent access to level-two (L2) cache or memory can require dozens or hundreds of clock cycles to complete, during which time the processor is typically idle, performing no useful work.

A number of techniques are presently used (or have been proposed) to hide this cache-miss latency. Some processors support out-of-order execution, in which instructions are kept in an issue queue, and are issued "out-of-order" when operands become available. Unfortunately, existing out-of-order designs have a hardware complexity that grows quadratically with the size of the issue queue. Practically speaking, this constraint limits the number of entries in the issue queue to one or two hundred, which is not sufficient to hide memory latencies as processors continue to get faster. Moreover, constraints on the number of physical registers which are available for register renaming purposes during out-of-order execution also limits the effective size of the issue queue.

Some processor designers have proposed entering a "scout mode" during processor stall conditions. In scout mode, instructions are speculatively executed to prefetch future loads, but results are not committed to the architectural state of the processor. For example, see U.S. patent application Ser. No. 10/741,944, filed 19 Dec. 2003, entitled, "Generating Prefetches by Speculatively Executing Code through Hardware Scout Threading," by inventors Shailender Chaudhry and Marc Tremblay. This solution to the latency problem eliminates the complexity of the issue queue and the rename unit, and also achieves memory-level parallelism. However, it suffers from the disadvantage of having to re-compute results of computational operations that were performed in scout mode.

To avoid performing these re-computations, processor designers have proposed entering an "execute-ahead" mode, wherein instructions that cannot be executed because of unresolved data dependencies are deferred, and wherein other non-deferred instructions are executed in program order. When an unresolved data dependency is ultimately resolved during execute-ahead mode, the system executes deferred instructions in a deferred-execution mode, wherein deferred instructions that able to be executed are executed in program order, and wherein other deferred instructions that still cannot be executed because of unresolved data dependencies are deferred again. For example, see U.S. patent application Ser. No. 10/686,061, filed 14 Oct. 2003, entitled, "Selectively Deferring the Execution of Instructions with Unresolved Data Dependencies as They Are Issued in Program Order," by inventors Shailender Chaudhry and Marc Tremblay.

Scout mode, execute-ahead and deferred mode are all forms of "speculative execution," wherein the processor first performs a checkpointing operation to preserve the architectural state of the processor, and then executes subsequent instructions speculatively. In scout mode, instructions are executed to prefetch future loads but the results of the instructions are not used for other purposes. Hence, the processor must eventually return to the launch-point instruction (which caused the processor to leave normal-execution mode) to resume normal non-speculative execution.

In contrast, during execute-ahead mode and deferred mode, it is possible for all of the deferred instructions to complete successfully, in which case results of the instructions completed during execute-ahead mode and deferred mode are committed to the architectural state of the processor. However, if a non-data dependent stall condition is encountered during execute-ahead mode or deferred mode, the processor may enter scout mode, in which case the processor will eventually use the checkpoint to return to the launch point instruction.

If the processor quickly returns from speculative execution, inter-instruction data dependencies can potentially cause a register read-after-write (RAW) hazard to arise. Some conventional in-order processors, which do not support speculative execution, maintain a "short-latency scoreboard," which keeps track of register dependencies between short-latency instructions. This enables such processors to delay issuance of instructions that depend upon uncompleted short-latency instructions, thereby preventing register RAW hazards from occurring during normal execution.

However, if a processor returns quickly from speculative execution, it is possible for a short-latency instruction, which was issued prior to entering speculative-execution mode, to not have produced a forwardable result. In this case, a RAW hazard can potentially arise unless the issuance of subsequent dependent instructions can be delayed until the short-latency instruction completes.

Hence, what is needed is a method and an apparatus for avoiding register RAW hazards upon returning from speculative execution.

SUMMARY

One embodiment of the present invention provides a system that avoids register read-after-write (RAW) hazards upon returning from a speculative-execution mode. This system operates in a processor with an in-order architecture, wherein the processor includes a short-latency scoreboard that delays issuance of instructions that depend upon uncompleted short-latency instructions. During operation, the system issues instructions for execution in program order during a normal-execution mode. Upon encountering a condition (a launch condition) during an instruction (a launch-point instruction), which causes the processor to enter the speculative-execution mode, the system generates a checkpoint that can subsequently be used to return execution to the launch-point instruction, and commences execution in the speculative-execution mode. Upon encountering a condition that causes the processor to leave the speculative-execution mode and return to the launch-point instruction, the system uses the checkpoint to resume execution in the normal-execution mode from the launch-point instruction. In doing so, the system ensures that entries, which were in the short-latency scoreboard prior to entering the speculative-execution mode, and which are not yet resolved, are accounted for in order to prevent register RAW hazard when resuming execution from the launch-point instruction.

In a variation on this embodiment, ensuring that entries in the short-latency scoreboard are accounted for involves waiting a sufficient amount of time to ensure that the longest possible short-latency instruction completes before resuming execution from the launch-point instruction.

In a variation on this embodiment, ensuring that entries in the short-latency scoreboard are accounted for involves keeping track the longest-remaining latency for any short-latency instruction which was issued prior to entering the speculative-execution mode, and then waiting for the short-latency instruction with the longest-remaining latency to complete before resuming execution from the launch-point instruction.

In a variation on this embodiment, ensuring that entries in the short-latency scoreboard are accounted for involves: making a copy of the short-latency scoreboard prior to entering the speculative-execution mode. Next, during speculative execution, short-latency instructions issued prior to entering the speculative-execution mode clear their entries in both the short-latency scoreboard and the copy of the short-latency scoreboard when their data becomes ready. In contrast, short-latency instructions issued during the speculative-execution mode operate on only the copy of the short-latency scoreboard. Upon resuming execution in the normal-execution mode, the system discards the copy of the short-latency scoreboard and resumes use of the short-latency scoreboard.

In a variation on this embodiment, the launch condition is a stall condition, and the speculative-execution mode is a scout mode, wherein instructions are speculatively executed to prefetch future loads, but wherein results are not committed to the architectural state of the processor.

In a variation on this embodiment, the launch condition is an unresolved data dependency encountered while executing a launch-point instruction, and the speculative-execution mode is an execute-ahead mode, wherein instructions that cannot be executed because of an unresolved data dependency are deferred, and wherein other non-deferred instructions are executed in program order.

In a further variation, if the unresolved data dependency is resolved during execute-ahead mode, the system executes deferred instructions in a deferred-execution mode, wherein deferred instructions that able to be executed are executed in program order, and wherein other deferred instructions that still cannot be executed because of unresolved data dependencies are deferred again.

In a further variation, if some deferred instructions are deferred again during the deferred-execution mode, the method further involves returning to execute-ahead mode at the point where execute-ahead mode left off.

In a further variation, if all deferred instructions are executed in the deferred-execution mode, the method further involves returning to the normal-execution mode to resume normal program execution from the launch-point instruction.

In a variation on this embodiment, generating the checkpoint involves saving a precise architectural state of the processor to facilitate subsequent recovery from exceptions that arise during the speculative-execution mode.

BRIEF DESCRIPTION OF THE FIGURES

FIG. 4A illustrates a short-latency scoreboard in accordance with an embodiment of the present invention.

FIG. 4B illustrates a long-latency scoreboard in accordance with an embodiment of the present invention.

FIG. 5 presents a state diagram, which includes execute-ahead mode and scout mode, in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Processor

Figure 1:
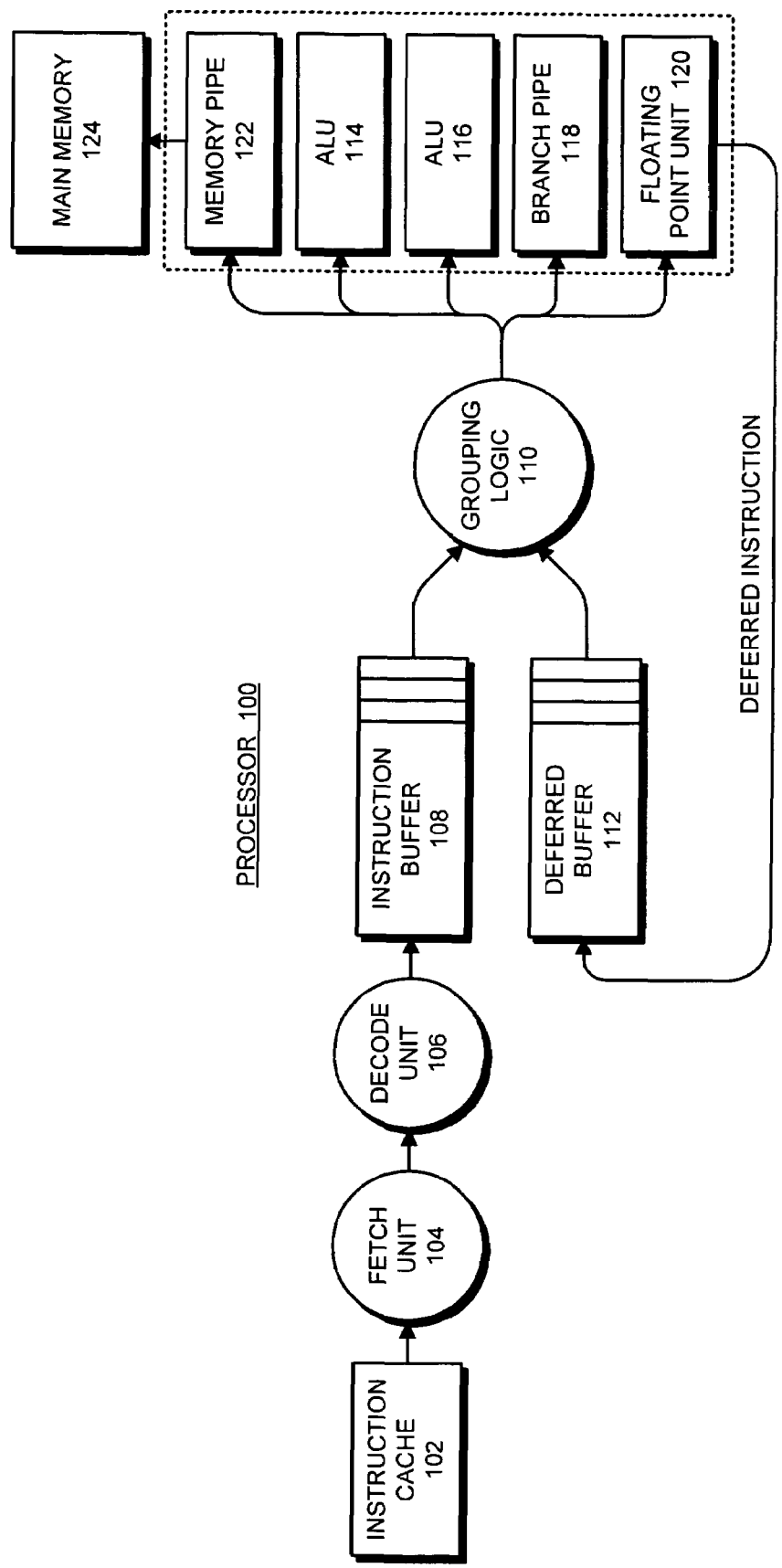
FIG. 1 illustrates a processor in accordance with an embodiment of the present invention.

FIG. 1 illustrates the design of a processor 100 in accordance with an embodiment of the present invention. Processor 100 can generally include any type of processor, including, but not limited to, a microprocessor, a mainframe computer, a digital signal processor, a personal organizer, a device controller and a computational engine within an appliance. As is illustrated in FIG. 1, processor 100 includes instruction cache 102, fetch unit 104, decode unit 106, instruction buffer 108, deferred buffer 112, grouping logic 110, memory 124, arithmetic logic unit (ALU) 114, ALU 116, branch pipe 118 and floating point unit 120.

During operation, fetch unit 104 retrieves instructions to be executed from instruction cache 102, and feeds these instructions into decode unit 106. Decode unit 106 forwards the instructions to be executed into instruction buffer 108, which is organized as a FIFO buffer. Instruction buffer 108 feeds instructions in program order into grouping logic 110, which groups instructions together and sends them to execution units, including memory pipe 122 (for accessing memory 124), ALU 114, ALU 116, branch pipe 118 (which resolves conditional branch computations), and floating point unit 120.

If an instruction cannot be executed due to an unresolved data dependency, such as an operand that has not returned from a load operation, the system defers execution of the instruction and moves the instruction into deferred buffer 112. Note that like instruction buffer 108, deferred buffer 112 is also organized as a FIFO buffer.

When the data dependency is eventually resolved, instructions from deferred buffer 112 are executed in program order with respect to other deferred instructions, but not with respect to other previously executed non-deferred instructions. This process is described in more detail below with reference to FIG. 5.

Buffers

Figure 2:
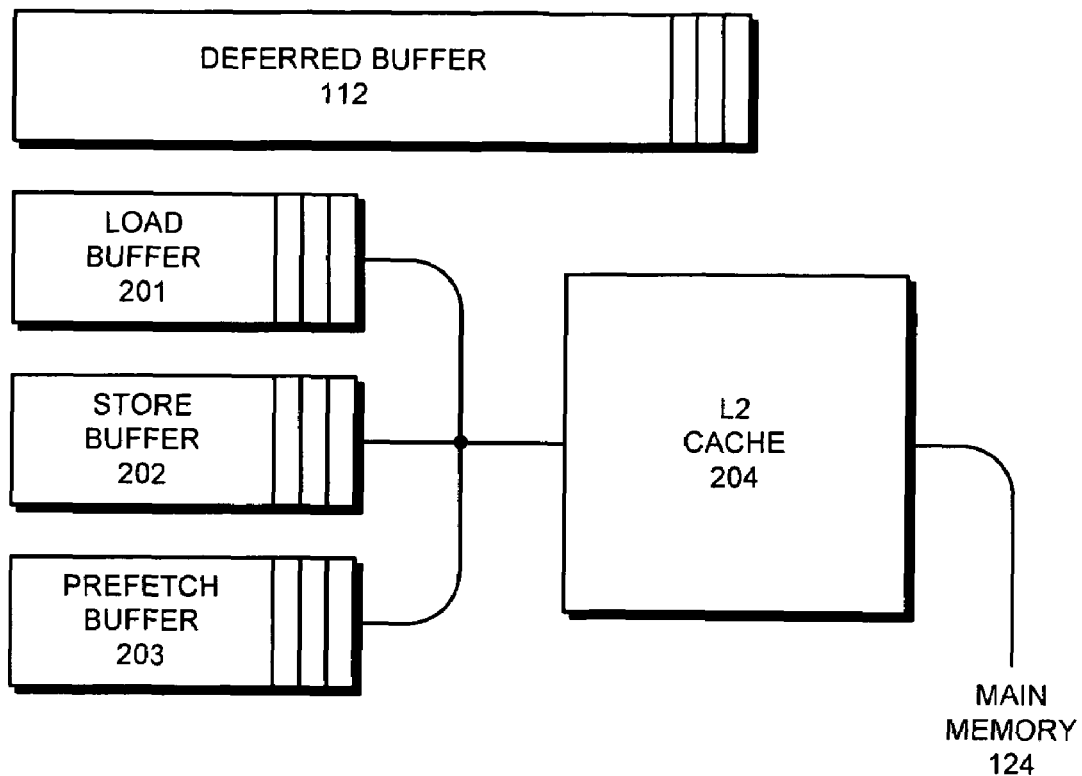
FIG. 2 illustrates various buffers within a processor in accordance with an embodiment of the present invention.

FIG. 2 illustrates various buffers within processor 100 in accordance with an embodiment of the present invention. These buffers include load buffer 201, store buffer 202 and prefetch buffer 203, which are well-known structures in existing processors. Also illustrated in FIG. 2 is a deferred buffer 112 (from FIG. 1) and Level 2 (L2) cache 204.

Load buffer 201, store buffer 202 and prefetch buffer 203 hold entries for load, store and prefetch instructions that are waiting to access slower portions of the memory hierarchy, such as L2 cache 204 and possibly main memory 124.

Keeping Track of Dependencies

Figure 3:
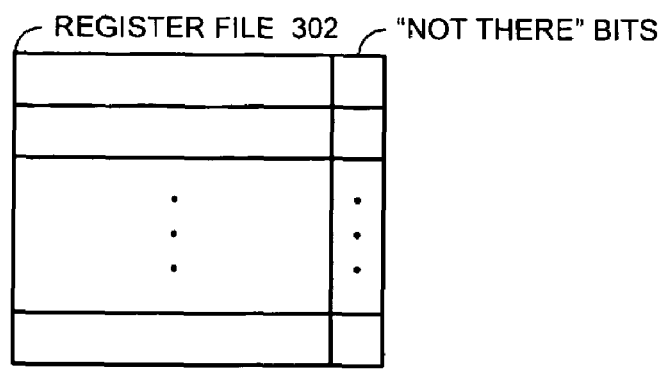
FIG. 3 illustrates a register file in accordance with an embodiment of the present invention.

The present invention keeps track of data dependencies in order to determine if an instruction is subject to an unresolved data dependency. In one embodiment of the present invention, this involves maintaining state information for each register, which indicates whether or not a value in the register depends on an unresolved data dependency. For example, FIG. 3 illustrates a register file 302 in accordance with an embodiment of the present invention. Each register in register file 302 is associated with a "not-there" bit, which keeps track of whether a valid operand value is contained in the register, or if the operand cannot be produced because of an unresolved data dependency. For example, if a register is waiting for an operand to return from a load operation, the corresponding not there bit is set to indicate that the desired operand value is not present in the register.

When a subsequent instruction references a source operand value that is marked as not-there, and generates a result that is stored in a destination register, the system marks the destination register as not-there to indicate that the value in the destination register also depends on the unresolved data-dependency. This can be accomplished by marking the not-there bit of the destination register with the "OR" of the not-there bits for source registers of the instruction.

Short-Latency and Long-Latency Scoreboard

The processor illustrated in FIG. 1 includes a short-latency scoreboard 402 (illustrated in FIG. 4A) and a long-latency scoreboard 404 (illustrated in FIG. 4B).

Short-latency scoreboard 402 contains a flag (bit) for each register. This flag bit indicates whether the register is the destination of a short-latency instruction which has been issued, but has not yet produced a forwardable result. Note that a short-latency instruction can be any type of deterministic multiple-cycle instruction that writes a result to a destination register. By examining short-latency scoreboard 402, the processor is able to delay issuance of instructions that depend upon uncompleted short-latency instructions, thereby avoiding possible register RAW hazards.

During operation, the processor sets a flag for a register in short-latency scoreboard 402 when a short-latency instruction is issued. When the result of the short-latency instruction becomes available for forwarding, the corresponding flag for the destination register is cleared.

Long-latency scoreboard 404 keeps track of the register destinations for long and/or variable-latency operations, such as loads. When data returns from a long-latency instruction, such as a load, the processor performs a content-addressable-memory (CAM) search on the long-latency scoreboard to determine the destination register for the instruction.

Note that the distinction between short latency instructions and long-latency instructions is a design decision. For example, a multiply instruction having a ten-cycle latency could be classified either way.

Long-latency scoreboard 404 illustrated in FIG. 4B has a fixed size, which is determined based on the number of outstanding loads and divides that the processor is designed to support. Each entry in long-latency scoreboard 404 includes an instruction ID (IID) 408, which identifies the instruction, as well as a register ID 406 for the instruction's destination register. Each entry also includes space for returned data 414.

Each entry in long-latency scoreboard 410 also includes a drop bit 410, which facilitates dropping data for purposes of forwarding, but maintaining the data for trap purposes. (Each entry also includes a speculative-drop bit 410, which is set during speculative-execution mode.)

State Diagram

FIG. 5 presents a state diagram which includes execute-ahead mode 504 and the scout mode 508 in accordance with an embodiment of the present invention. The system starts in normal-execution mode 502, wherein instructions are executed in program order as they are issued from instruction buffer 108 (see FIG. 1).

Next, if an unresolved data dependency arises during execution of an instruction, the system moves to execute-ahead mode 504. An unresolved data dependency can include: a use of an operand that has not returned from a preceding load miss; a use of an operand that has not returned from a preceding translation lookaside buffer (TLB) miss; a use of an operand that has not returned from a preceding full or partial read-after-write (RAW) from store buffer operation; and a use of an operand that depends on another operand that is subject to an unresolved data dependency.

While moving to execute-ahead mode 504, the system generates a checkpoint that can be used, if necessary, to return execution of the process to the point where the unresolved data dependency was encountered; this point is referred to as the "launch point." (Generating the checkpoint involves saving the precise architectural state of processor 100 to facilitate subsequent recovery from exceptions that arise during execute-ahead mode 504 or deferred mode 506.) The system also "defers" execution of the instruction that encountered the unresolved data dependency by storing the instruction in deferred buffer 112.

While operating in execute-ahead mode 504, the system continues to execute instructions in program order as they are received from instruction buffer 108, and any instructions that cannot execute because of an unresolved data dependency are deferred into deferred buffer 112.

During execute-ahead mode 504, if an unresolved data dependency is finally resolved, the system moves into deferred mode 506, wherein the system attempts to execute instructions from deferred buffer 112 in program order. Note that the system attempts to execute these instructions in program order with respect to other deferred instructions in deferred buffer 112, but not with respect to other previously executed non-deferred instructions (and not with respect to deferred instructions executed in previous passes through deferred buffer 112). During this process, the system defers execution of deferred instructions that still cannot be executed because of unresolved data dependencies by placing these again-deferred instruction back into deferred buffer 112. On the other hand, the system executes other instructions that can be executed in program order with respect to each other.

After the system completes a pass through deferred buffer 112, if deferred buffer 112 is empty, the system moves back into normal-execution mode 502. This may involve committing changes made during execute-ahead mode 504 and deferred mode 506 to the architectural state of processor 100, if such changes have not been already committed. It can also involve throwing away the checkpoint generated when the system moved into execute-ahead mode 504.

On the other hand, if deferred buffer 112 is not empty after the system completes a pass through deferred buffer 112, the system returns to execute-ahead mode 504 to execute instructions from instruction buffer 108 from the point where the execute-ahead mode 504 left off.

If a non-data dependent stall condition (except for a load buffer full or store buffer full condition) arises while the system is in normal-execution mode 502 or in execute-ahead mode 504, the system moves into scout mode 508. (This non-data-dependent stall condition can include: a memory barrier operation; or a deferred queue full condition.) In scout mode 508, instructions are speculatively executed to prefetch future loads, but results are not committed to the architectural state of processor 100.

Scout mode 508 is described in more detail in a pending U.S. patent application entitled, "Generating Prefetches by Speculatively Executing Code Through Hardware Scout Threading," by inventors Shailender Chaudhry and Marc Tremblay, having Ser. No. 10/741,944, and filing date 19 Dec. 2003, which is hereby incorporated by reference to describe implementation details of scout mode 508.

Unfortunately, computational operations performed during scout mode 508 need to be recomputed again, which can require a large amount of computational work.

When the original "launch point" stall condition is finally resolved, the system moves back into normal-execution mode 502, and, in doing so, uses the previously generated checkpoint to resume execution from the launch point instruction that encountered the launch point stall condition. The launch point stall condition is the stall condition that originally caused the system to move out of normal-execution mode 502. For example, the launch point stall condition can be the data-dependent stall condition that caused the system to move from normal-execution mode 502 to execute-ahead mode 504, before moving to scout mode 508. Alternatively, the launch point stall condition can be the non-data-dependent stall condition that caused the system to move directly from normal-execution mode 502 to scout mode 508.

Process of Returning to Normal-Execution Mode

Figure 6:
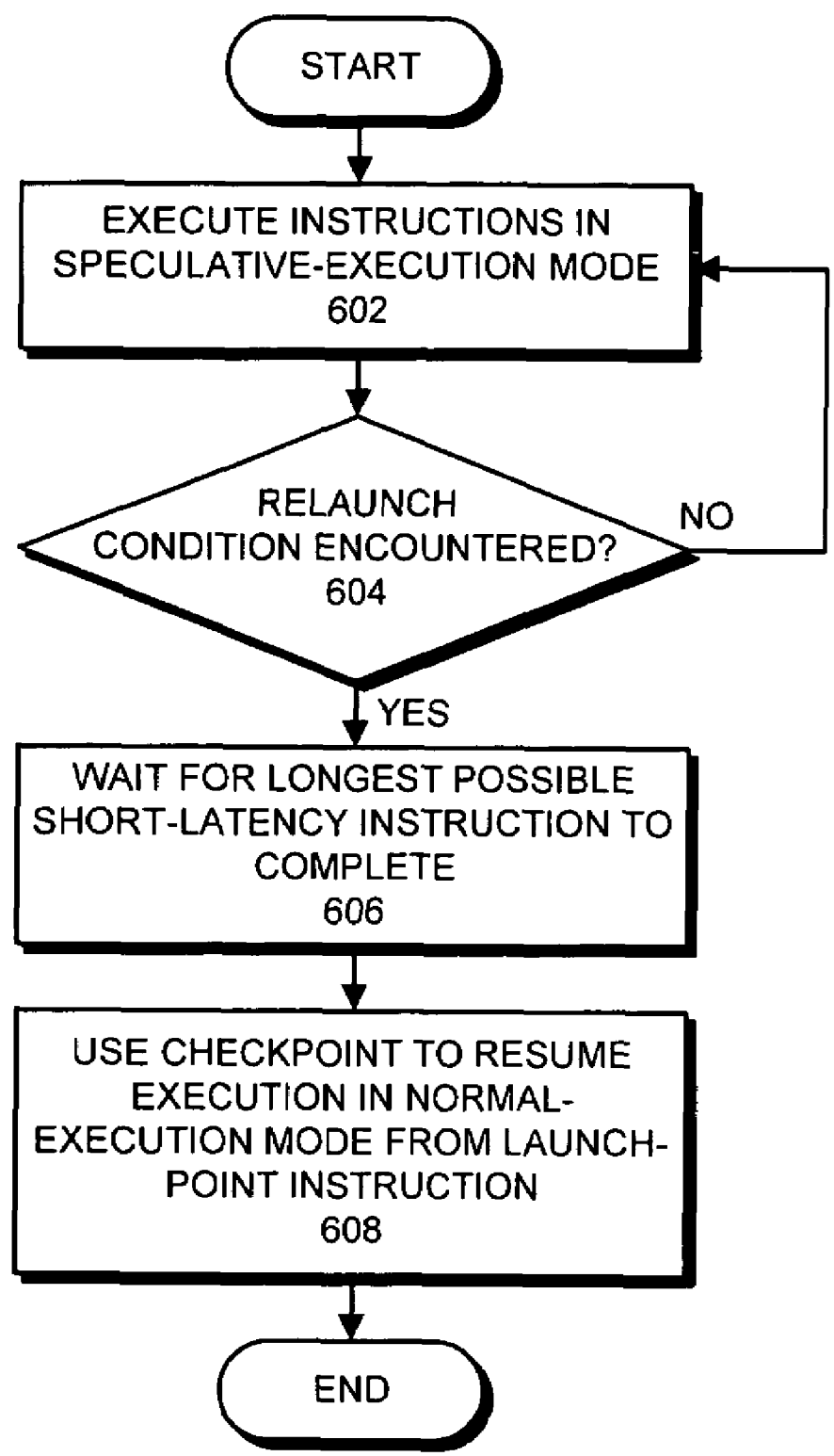
FIG. 6 presents a flow chart illustrating the process of returning to normal-execution mode in accordance with an embodiment of the present invention.

FIG. 6 presents a flow chart illustrating the process of returning to normal-execution mode 502 in accordance with an embodiment of the present invention. The process starts when the processor is executing instructions in speculative-execution mode (step 602) (which can include scout mode 508, execute-ahead mode 504 or deferred mode 506.) During speculative-execution mode, the system is continually trying to determine if a re-launch condition is encountered that causes the system to use the checkpoint to return to the launch point (step 604). If so, the system uses the checkpoint to recommence execution from the launch point. For example, in scout mode 508, when a condition that caused the processor to enter scout mode 508 (such as a load miss) is resolved, the system can return to the launch point to recommence normal execution of the program.

However, before recommencing execution from the launch point, the system remains in speculative-execution mode for a sufficient amount of time to ensure that the longest possible short-latency instruction completes (step 606). Next, the system uses the checkpoint to resume execution in normal mode from the launch-point instruction (step 608).

Note that this embodiment of the present invention always waits for the longest possible short-latency instruction to complete before returning to normal-execution mode 502. This may cause the system to wait needlessly if no short-latency instructions remain unresolved. It is possible to solve this problem using other techniques without having to wait for the longest possible short-latency instruction to complete; two such techniques are described below.

Second Technique for Avoiding Register RAW Hazards

Figure 7A:
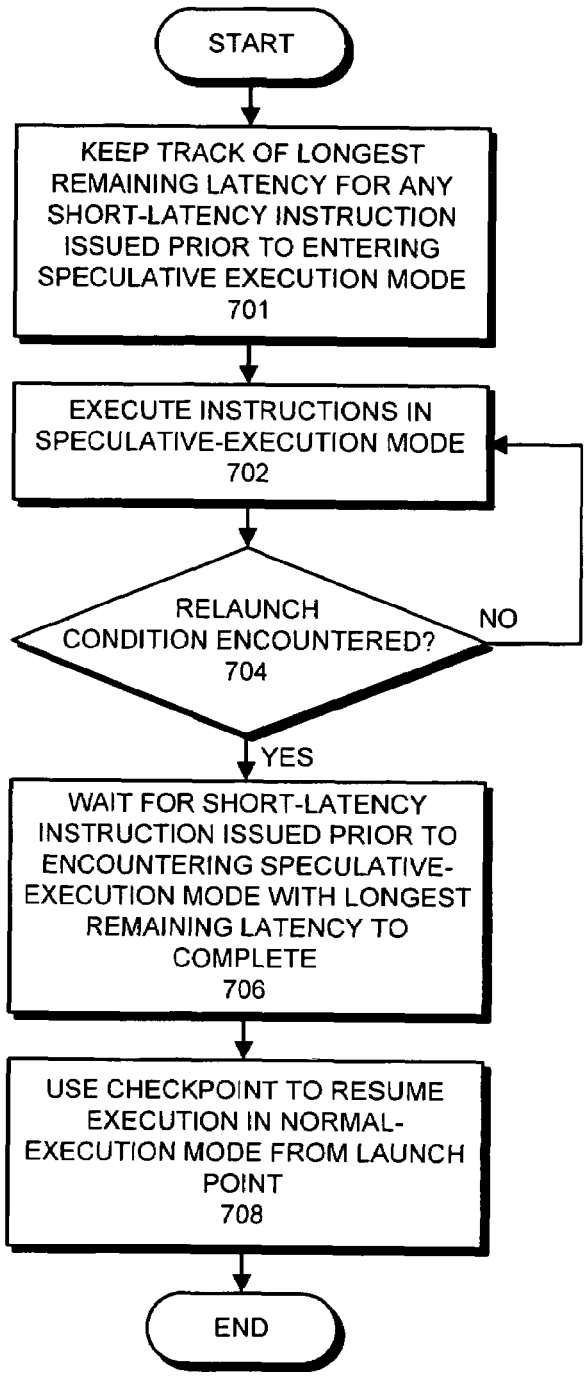
FIG. 7A presents a flow chart illustrating the process of returning to normal-execution mode in accordance with another embodiment of the present invention.
Figure 7B:
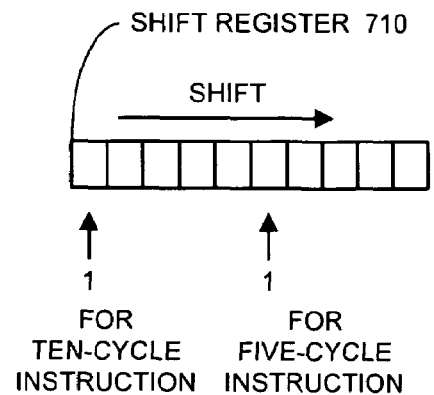
FIG. 7B illustrates a shift register that keeps track of the longest remaining latency for any instruction issued prior to entering speculative-execution mode in accordance with an embodiment of the present invention.

FIG. 7A presents a flow chart illustrating the process of returning to normal-execution mode 502 in accordance with an alternative embodiment of the present invention. During speculative-execution mode, the system keeps track of the longest remaining latency for any short-latency instruction issued prior to entering speculative-execution mode (step 701). This can involve maintaining a shift register as is illustrated in FIG. 7B, which continually shifts bits on each clock cycle. Every time a short-latency instruction is issued, a bit is set in the shift register, wherein the location of the bit is determined by the time it takes for the short-latency instruction to produce a forwardable result. For example, if it takes five cycles to produce a forwardable result, the fifth bit from the end of the shift register is set. The processor cannot re-launch until all bits in this register are zero. Note that this technique tracks remaining latency globally, not on a per-register or per-instruction basis.

For example, suppose a multiply instruction takes ten-cycles, and a shift instruction takes five-cycles to produce a forwardable result. Also assume that we issue a multiply at cycle N. If the system enters speculative mode immediately, it has to wait until cycle N+10 before it can return to normal-execution mode 502. Suppose we remain in normal-execution mode 502 and issue a shift having latency of five cycles at cycle N+2. Now, if we enter speculative-execution mode, we still have to remain in speculative-execution mode until cycle N+10 (when both the shift instruction and the multiply instruction are complete). Suppose we remain in normal-execution mode 502 and issue another shift at N+7. If we now enter speculative-execution mode, we would have to remain there until cycle N+12.

Referring back to the flow chart in FIG. 7A, while the system tracks the longest latency, the system executes instructions in speculative-execution mode (step 702). During speculative-execution mode, the system determines if a re-launch condition is encountered that causes the system to use the checkpoint to return to the launch point (step 704). If so, the system uses the checkpoint to recommence execution from the launch point.

However, before recommencing execution from the launch point, the system waits for the short-latency instruction issued prior to entering speculative-execution mode with the longest-remaining latency to complete before resuming execution from the launch-point instruction (step 706). Next, the system uses the checkpoint to resume execution in normal mode from the launch-point instruction (step 708).

Third Technique for Avoiding Register RAW Hazards

Figure 8A:
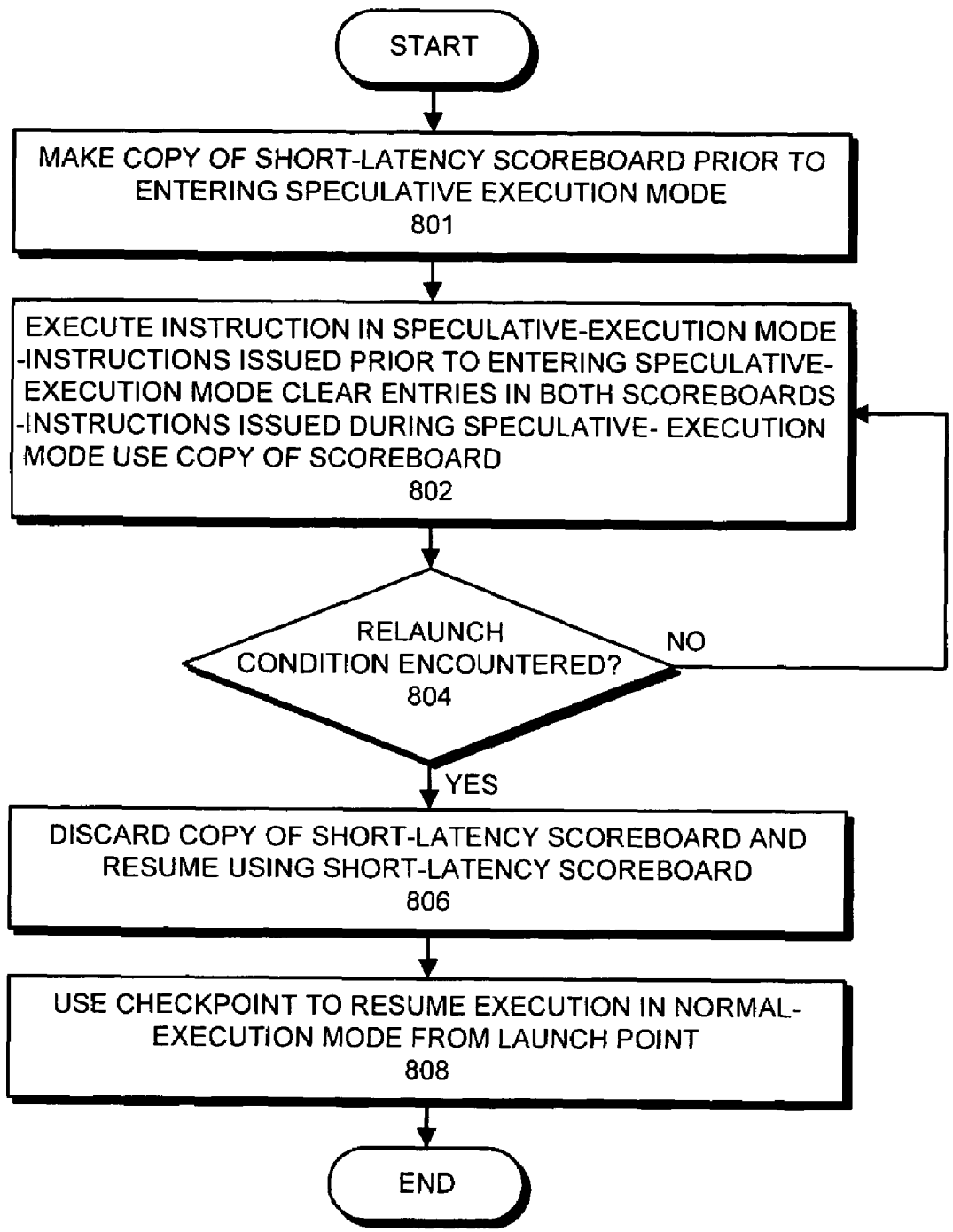
FIG. 8A presents a flow chart illustrating the process of returning to normal-execution mode in accordance with yet another embodiment of the present invention.
Figure 8B:
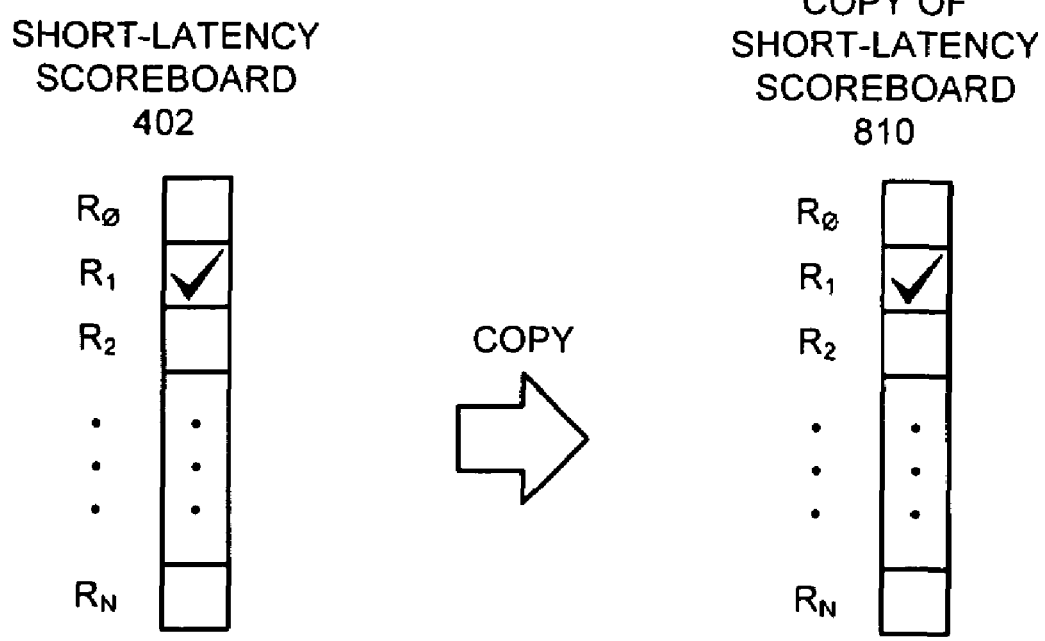
FIG. 8B illustrates how a copy of the short-latency scoreboard can be maintained to facilitate avoiding RAW hazards in accordance with an embodiment of the present invention.

FIG. 8A presents a flow chart illustrating the process of returning to normal-execution mode 502 in accordance with another alternative embodiment of the present invention. Before entering speculative-execution mode, the system makes a copy of the short-latency scoreboard (step 801). (This process is illustrated in FIG. 8B.)

Next, the system proceeds to execute instructions in speculative-execution mode (step 802). Note that during the speculative-execution mode, instructions issued prior to entering speculative-execution mode clear entries on both scoreboards when they produce forwardable results. However, instructions issued during speculative-execution mode only operate on the copy of the scoreboard, and use the copy of the scoreboard to avoid register RAW hazards.

During the speculative-execution mode, the system determines if a re-launch condition is encountered that causes the system to use the checkpoint to return to the launch point (step 804). If so, the system uses the checkpoint to recommence execution from the launch point.

However, before recommencing execution from the launch point, the system discards the copy of the short-latency scoreboard and resumes using the original short-latency scoreboard (step 806). Next, the system uses the checkpoint to resume execution in normal mode from the launch-point instruction (step 808).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for avoiding register read-after-write (RAW) hazards upon returning from a speculative-execution mode in a processor with an in-order architecture, wherein the processor includes a short-latency scoreboard that delays issuance of instructions that depend upon uncompleted short-latency instructions, the method comprising:

issuing instructions for execution in program order during execution of a program in a normal-execution mode;

upon encountering a condition (a launch condition) during an instruction (a launch-point instruction), which causes the processor to enter the speculative-execution mode, generating a checkpoint that can subsequently be used to return execution of the program to the launch-point instruction, and commencing execution in the speculative-execution mode; and upon encountering a condition that causes the processor to leave the speculative-execution mode and return to the launch-point instruction, using the checkpoint to resume execution in the normal-execution mode from the launch-point instruction;

wherein resuming execution in the normal-execution mode involves ensuring that entries that were in the short-latency scoreboard prior to entering the speculative-execution mode, and which are not yet resolved, are accounted for when resuming execution from the launch-point instruction; and wherein generating the checkpoint involves saving a precise architectural state of the processor to facilitate subsequent recovery from exceptions that arise during the speculative-execution mode.

2. The method of claim 1, wherein ensuring that entries in the short-latency scoreboard are accounted for involves waiting a sufficient amount of time to ensure that the longest possible short-latency instruction completes before resuming execution from the launch-point instruction.

3. The method of claim 1, wherein ensuring that entries in the short-latency scoreboard are accounted for involves:

keeping track the longest-remaining latency for any short-latency instruction which was issued prior to entering the speculative-execution mode; and waiting for the short-latency instruction with the longest-remaining latency to complete before resuming execution from the launch-point instruction.

4. The method of claim 1, wherein ensuring that entries in the short-latency scoreboard are accounted for involves:

making a copy of the short-latency scoreboard prior to entering the speculative-execution mode;

wherein short-latency instructions issued prior to entering the speculative-execution mode clear their entries in both the short-latency scoreboard and the copy of the short-latency scoreboard when their data becomes ready;

wherein short-latency instructions issued during the speculative-execution mode operate by using the copy of the short-latency scoreboard; and wherein resuming execution in the normal-execution mode involves discarding the copy of the short-latency scoreboard and resuming use of the short-latency scoreboard.

5. The method of claim 1, wherein the launch condition is a stall condition; and wherein the speculative-execution mode is a scout mode, wherein instructions are speculatively executed to prefetch future loads, but wherein results are not committed to the architectural state of the processor.

6. The method of claim 1, wherein the launch condition is an unresolved data dependency encountered while executing the launch-point instruction; and wherein the speculative-execution mode is an execute-ahead mode, wherein instructions that cannot be executed because of an unresolved data dependency are deferred, and wherein other non-deferred instructions are executed in program order.

7. The method of claim 6, wherein if the unresolved data dependency is resolved during execute-ahead mode, the method further involves executing deferred instructions in a deferred-execution mode, wherein deferred instructions that able to be executed are executed in program order, and wherein other deferred instructions that still cannot be executed because of unresolved data dependencies are deferred again.

8. The method of claim 7, wherein if some deferred instructions are deferred again during the deferred-execution mode, the method further involves returning to execute-ahead mode at the point where execute-ahead mode left off.

9. The method of claim 7, wherein if all deferred instructions are executed in the deferred-execution mode, the method further involves returning to the normal-execution mode to resume normal program execution from the launch-point instruction.

10. An apparatus that avoids register read-after-write (RAW) hazards upon returning from a speculative-execution mode, comprising:
a processor with an in-order architecture;
a short-latency scoreboard within the processor, which delays issuance of instructions that depend upon uncompleted short-latency instructions; and
an execution mechanism configured to issue instructions for execution in program order during execution of a program in a normal-execution mode;
wherein upon encountering a condition (a launch condition) during an instruction (a launch-point instruction) that causes the processor to enter the speculative-execution mode, the execution mechanism is configured to,
  generate a checkpoint that can subsequently be used to return execution of the program to the launch-point instruction, and to
  commence execution in the speculative-execution mode;
wherein upon encountering a condition that causes the processor to leave the speculative-execution mode and return to the launch-point instruction, the execution mechanism is configured to use the checkpoint to resume execution in the normal-execution mode from the launch-point instruction; and
wherein while resuming execution in the normal-execution mode, the execution mechanism is configured to ensure that entries that were in the short-latency scoreboard prior to entering the speculative-execution mode, and which are not yet resolved, are accounted for when resuming execution from the launch-point instruction; and
wherein while generating the checkpoint, the execution mechanism is configured to save a precise architectural state of the processor to facilitate subsequent recovery from exceptions that arise during the speculative-execution mode.

11. The apparatus of claim 10, wherein while ensuring that entries in the short-latency scoreboard are accounted for, the execution mechanism is configured to wait a sufficient amount of time to ensure that the longest possible short-latency instruction completes before resuming execution from the launch-point instruction.

12. The apparatus of claim 10, wherein while ensuring that entries in the short-latency scoreboard are accounted for, the execution mechanism is configured to:
keep track the longest-remaining latency for any short-latency instruction which was issued prior to entering the speculative-execution mode; and to
wait for the short-latency instruction with the longest-remaining latency to complete before resuming execution from the launch-point instruction.

13. The apparatus of claim 12, wherein while ensuring that entries in the short-latency scoreboard are accounted for, the execution mechanism is configured to:
make a copy of the short-latency scoreboard prior to entering the speculative-execution mode;
wherein short-latency instructions issued prior to entering the speculative-execution mode clear their entries in both the short-latency scoreboard and the copy of the short-latency scoreboard when their data becomes ready;
wherein short-latency instructions issued during the speculative-execution mode operate by using the copy of the short-latency scoreboard; and
wherein while resuming execution in the normal-execution mode, the execution mechanism is configured to discard the copy of the short-latency scoreboard and to resume use of the short-latency scoreboard.

14. The apparatus of claim 12,
wherein the launch condition is a stall condition; and
wherein the speculative-execution mode is a scout mode, wherein instructions are speculatively executed to prefetch future loads, but wherein results are not committed to the architectural state of the processor.

15. The apparatus of claim 12,
wherein the launch condition is an unresolved data dependency encountered while executing the launch-point instruction; and
wherein the speculative-execution mode is an execute-ahead mode, wherein instructions that cannot be executed because of an unresolved data dependency are deferred, and wherein other non-deferred instructions are executed in program order.

16. The apparatus of claim 15, wherein if the unresolved data dependency is resolved during execute-ahead mode, the execution mechanism is configured to defer instructions in a deferred-execution mode, wherein deferred instructions that able to be executed are executed in program order, and wherein other deferred instructions that still cannot be executed because of unresolved data dependencies are deferred again.

17. The apparatus of claim 16, wherein if some deferred instructions are deferred again during the deferred-execution mode, the execution mechanism is configured to return to execute-ahead mode at the point where execute-ahead mode left off.

18. The apparatus of claim 16, wherein if all deferred instructions are executed in the deferred-execution mode, the execution mechanism is configured to return to the normal-execution mode to resume normal program execution from the launch-point instruction.

19. A computer system that avoids register read-after-write (RAW) hazards upon returning from a speculative-execution mode, comprising:
a processor with an in-order architecture;
a memory;
a short-latency scoreboard within the processor, which delays issuance of instructions that depend upon uncompleted short-latency instructions; and an execution mechanism within the processor configured to issue instructions for execution in program order during execution of a program in a normal-execution mode;

wherein upon encountering a condition (a launch condition) during an instruction (a launch-point instruction) that causes the processor to enter the speculative-execution mode, the execution mechanism is configured to, generate a checkpoint that can subsequently be used to return execution of the program to the launch-point instruction, and to commence execution in the speculative-execution mode;

wherein upon encountering a condition that causes the processor to leave the speculative-execution mode and return to the launch-point instruction, the execution mechanism is configured to use the checkpoint to resume execution in the normal-execution mode from the launch-point instruction; and wherein while resuming execution in the normal-execution mode, the execution mechanism is configured to ensure that entries that were in the short-latency scoreboard prior to entering the speculative-execution mode, and which are not yet resolved, are accounted for when resuming execution from the launch-point instruction; and wherein while generating the checkpoint, the execution mechanism is configured tosave a precise architectural state of the processor to facilitate subsequent recovery from exceptions that arise during the speculative-execution mode.

* * * * *

UNITED STATES PATENT AND TRADEMARK OFFICE
CERTIFICATE OF CORRECTION

| | | |
|---|---|---|
| PATENT NO. | : 7,257,700 B2 | Page 1 of 1 |
| APPLICATION NO. | : 11/053382 | |
| DATED | : August 14, 2007 | |
| INVENTOR(S) | : Shailender Chaudhry et al. | |

It is certified that error appears in the above-identified patent and that said Letters Patent is hereby corrected as shown below:

(At Column 11, line 55), please delete the word, "tosave" and replace with the words --to save--.

Signed and Sealed this

Fourth Day of December, 2007

JON W. DUDAS
*Director of the United States Patent and Trademark Office*